United States Patent Office 3,462,662
Patented Aug. 19, 1969

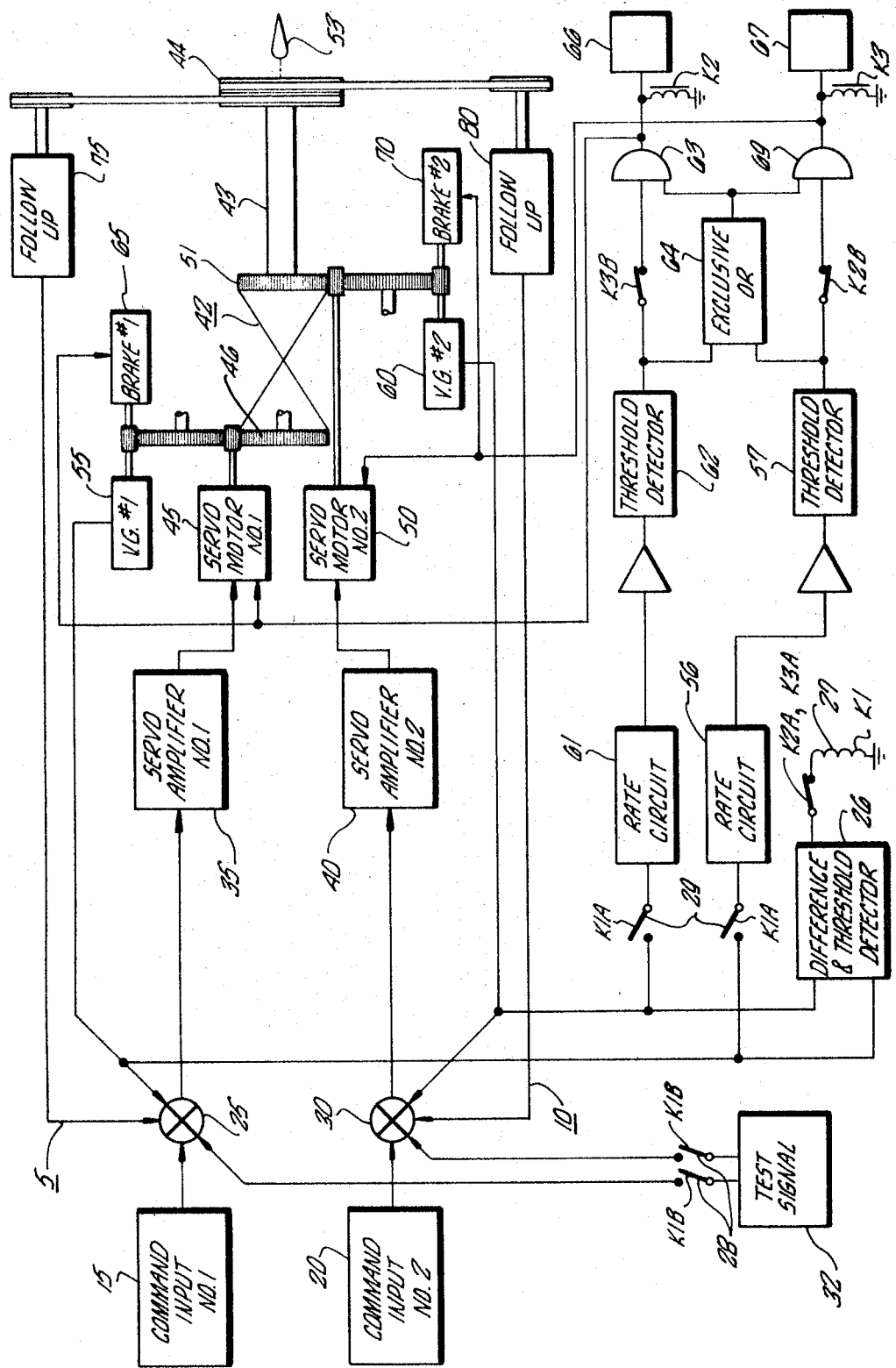

3,462,662
MONITORING AND FAULT CORRECTION SYSTEM FOR A MULTIPLE CHANNEL SERVO ACTUATOR
Warren E. Carpenter, Malibu, Calif., assignor to Lear Siegler, Inc., Santa Monica, Calif., a corporation of Delaware
Filed April 12, 1967, Ser. No. 630,298
Int. Cl. H02p 1/54, 5/46, 7/74
U.S. Cl. 318—18                             22 Claims

ABSTRACT OF THE DISCLOSURE

The invention of which certain representative embodiments are herein described relates to servomechanism devices for actuating the movement of a member. A multiple channel servomechanism system is described which has a hardover detection circuit responsive to a hardover condition in one servo channel for applying a test signal to all of the servo channels. The rate of response of each individual channel to this test signal is monitored, and logic circuitry respond to the monitoring by deactivating the channel which experienced the hardover condition.

BACKGROUND OF THE INVENTION

Field of the invention

Servomechanism systems for controlling movement of a member in vehicles such as aircraft, are typical fields of this invention. It has become commonplace to employ two or more systems in an effort to provide a safety factor should one system fail. In vehicles such as an aircraft, these systems are each normally controlled by an automatic pilot, or other command device, capable of emitting an electrical signal having an appropriate polarity, or phase so as to move the aircraft to a commanded position. The movement of the aircraft itself, in turn, normally nulls out further electrical commands.

Description of the prior art

Prior art servo systems, employing two or more servo channels are well known. A follow-up device is normally provided for each servo channel. Such follow-up devices are mechanically actuated by movement of the output member being driven by the channels to emit a feedback signal which is proportional to the amount of actual mechanical movement resulting at the member. Such prior art systems include hydraulic servo actuators, magnetic and electromagnetic servo actuators. It is known in such prior art systems to include a simulator or dummy channel in order to derive a reference necessary for determining which channel has experienced a failure. This simulator channel serves no purpose in driving the output member and is a costly and complex technique for failure detection.

Pilot initiated interrogate signals have also been applied to individual channels in order to determine which channel has failed. These interrogate procedures are time-consuming and are dangerous at crucial times such as flare-out during an automatic landing. At such a crucial time as flare-out, it is mandatory that a system automatically detect any failure in the multiple channels, and deactivate that channel before any uncommanded movement can take place at the steering surface controlled by the servo channels.

SUMMARY OF THE INVENTION

The foregoing disadvantages of the prior art are avoided in accordance with the principles of this invention wherein a failure in any one of a plurality of servo actuator channels is automatically detected, and means respond to this failure detection by immediately applying a test signal to all of the channels including the failed channel, which as yet is not identified. A hardover failure in one channel saturates the servo amplifier in that channel. Accordingly, when the test signal is applied to that channel the amplifier in the failed channel is saturated and does not react to the test signal. A servo amplifier in an operative channel on the other hand, is not saturated and it responds to the test signal by altering the rate at which the output member for that channel is being driven. Means individual to each channel are mechanically actuated by the movement of the output member to emit signals which are representative of the rate of change of movement introduced into the associated channel by the test signal.

Logic gating means are connected to these rate signal emitting circuits and are responsive to a difference in rate signals for deactivating the channel which did not exhibit any rate change at its driven output in response to the test signal.

DESCRIPTION OF THE DRAWINGS

The foregoing and other features and principles of this invention may more readily be understood by reference to the accompanying drawing which depicts a dual channel servo actuator system with fault monitoring and channel correction circuitry in accordance with the principles of this invention.

DESCRIPTION OF THE PREFERRED EMBODIMENT

A brief summary of the principles of my invention, in which one representative embodiment is depicted in the drawing, includes two electromechanical servo actuator channels 5 and 10. Each channel receives command signals from command circuits 15 and 20 such as are provided in an autopilot or an autoland system.

Input commands from circuits 15 and 20 are applied to summing junctions 25 and 30. A servo amplifier 35 in channel 5 is connected to the output of summing junction 25 and initially responds to the input command from circuit 15 by driving a servo motor 45 in a direction and at a velocity in accordance with the strength and polarity of the input command signal.

In a similar manner, a servo amplifier 40 provided in channel 10, drives a servo motor 50. The output shaft of servo motors 45 and 50 are geared to individual driving gears 46 and 51 which comprise a differential gear output unit 42. Such differential gear units are well known in the servomechanism art and need not be described in detail. Basically, the differential unit 42 drives an output 43 in accordance with the algebraic summation of the output drives from servo motors 45 and 50. In addition to driving the differential unit 42, the outputs of servo motors 45 and 50 also drive, via a gear train, individual velocity generators 55, 60 and individual brakes 65, 70. The brakes and velocity generators may be any type well known to the servomechanism art.

Brakes 65 and 70 respond to an input signal by locking-up the gear train and its associated half of the differential unit 42. When one side, such as gear 46 of differential unit 42 is locked against further movement, the output shift 43 may still be driven with full authority by the remaining gear 51 and its servo motor 50. Thus, if channel 5 has failed and channel 10 is in operation, the brake 65 is energized so as to lock the output shaft of servo motor 45 in place. The net result at differential unit 42 would be a reduction in output speed by approximately one-half of the output speed experienced when both channels are operating properly. This reduction in output speed does not adversely affect the system operation in that the gains for the remaining servo amplifier are set at a level which produces satisfactory operation for either dual or single channel drive.

The velocity generators 55 and 60 may also be any well-known generator employed in the servomechanism art which emits either an alternating or direct circuit signal. In a similar manner the servo amplifiers 35, 40 and servo motors 45, 50 may be either direct or alternating current type. The velocity generators 55 and 60 feed back signals to summing junctions 25 and 30 which are proportional to the driving velocity of output motors 45 and 50 respectively. These feedback signals applied to summing junctions 25 and 30 by velocity generators 55 and 60 are of a polarity and/or phase (depending upon alternating current or direct current operation) to oppose the command inputs from control circuits 15 and 20 respectively.

Follow-ups 75 and 80 are provided for channels 5 and 10 respectively. These follow-ups, as is well known, emit an output signal which is proportional to the amount of movement applied by the output shaft 43 to the driven member 44. This driven member 44 may be mechanically coupled to any member to be moved, such as member 53 which may be a rudder or other steering surface of a vehicle to be controlled. Inasmuch as the follow-ups 75 and 80 measure the total, or resultant, displacement of the driven member 44, the signals fed back by these follow-ups to summing junctions 25 and 30 represent the sum of the output of servo motors 45 and 50. In an ideal system follow-ups 75 and 80 would be moved a proper distance by the driven output 44 so as to feed back signals to summing junctions 25 and 30 which exactly null out the input commands from circuits 15 and 20. Such an ideal system, however, is not normally found in that slight variations in mechanical and electrical tolerances prevent the summing junctions 25 and 30 from being exactly nulled out. Instead, velocity generators 55 and 60 feed back to the summing junctions 25 and 30, small error signals which are equal and opposite in phase and/or polarity so that the servo motors 45 and 50 drive gears 46 and 51 of differential unit 42 in opposite directions. The resultant at the output shaft 43, however, is substantially zero.

Dual systems, i.e., dual servo channels, are provided to assure safety of operation in the event of a failure in one channel. However, in order to maintain a safe operation, it is necessary to identify which channel has experienced a failure so that channel may be quickly removed from the system. Such identification and removal is quickly and economically accomplished by the circuitry of this invention as described hereinafter with respect to an assumption that channel 5 fails and experiences a hardover condition.

A hardover failure in channel 5 may result from any one of several possible component failures. As typical examples the command input from circuit 15 may fail or vary widely from the actual command, or the servo amplifier 25 and/or servo motor 45 may fail and continue driving to an extent far in excess of that command by an input from circuit 15. The foregoing, of course, are just typical examples of some possible failures resulting in a hardover condition in that the output gear in the failed channel is driven to an extreme position. Such a failure in a given channel establishes a hardover signal which saturates the servo driving means such as a servo valve (hydraulic system) or a servo amplifier (magnetic and/or electromagnetic system). The remaining channels respond to any failure by noting an incorrect movement at the output member as compared with the intended movement for the output member. Thus, those channels which are operational tend to oppose the movement of the output member which results from a failure channel. However, such operational channels are not saturated. Thus, either the servo valve (hydraulic) or a servo amplifier (magnetic and/or electromagnetic) in an operational channel may respond to an input signal by some further movement of its output because it is not in a saturated condition as is the failed channel.

Assuming that channel 5 moves to an extreme clockwise condition in view of a hardover failure, then amplifier 35 is saturated as a result of excess signal magnitude applied to it by summing junction 25. At the same time servo amplifier 40 is tending to compensate for the hardover failure by driving servo motor 50 in a counterclockwise direction. These opposite directions are reflected by opposite polarity outputs from velocity generators 55 and 60. It should be understood, as mentioned hereinbefore, that velocity generators 55 and 60 often drive in opposite directions when both channels 5 and 10 are operational. However, when both channels are operational, the output signals are relatively small as compared to the signals emitted by the velocity generators 55 and 60 in a hardover failure condition in either channel.

A difference and threshold circuit 26 is connected to the feedback leads between generators 55 and 60 and summing junctions 25 and 30 respectively. This circuit 26 may be any suitable difference and threshold detector as is well known in the prior art. The threshold level for circuit 26 is set to be at a level in excess of a predetermined value that corresponds to the upper signal limit expected during normal operation when both channels 5 and 10 are in an unfailed, or operational, condition. When channel 5 has failed, as was just assumed, then the inputs to circuit 26 are both of different polarity, or phase, and both inputs will exceed their normal operational range.

Connected to the output of difference and threshold detector 26 is any signal responsive switching means such as K1 relay coil 27. This relay coil 27 will close both sets of normally open contacts K1A and K1B, which are identified as contacts 29 or 28, respectively. Contacts 28 apply an output signal from a test signal generator 32 to both channels 5 and 10. This test signal generator 32 may be any suitable oscillator which emits a slowly varying alternating current signal. This test signal may serve as a modulating signal if alternating current amplifiers are employed in the system of FIGURE 1. In either event, the test signal from generator 32 is applied through closed contacts 28 to summing junctions 25 and 30. The test signal in channel 5 does not alter the output condition of servo motor 45 because servo amplifier 35 is in a saturated condition and velocity generator 55 is already rotating at its peak velocity. In contradistinction, however, the test signal applied to summing junction 30 is passed on to servo amplifier 40 which acts upon it to either increase or decrease the output speed of servo motor 50. The variation in the rate of servo motor 50 is reflected in a signal change in the output of velocity generator 60.

A pair of rate circuits 56 and 61 respectively monitor the signals fed back by velocity generators 55 and 60 through a pair of closed contacts 29. Since the velocity generator 55 in the failed channel 5 does not vary in response to the test signal, there is no rate of change in output signal which can be detected by rate circuit 56. Rate circuit 61 on the other hand, detects the rate of change in the output signal from velocity generator 60. Rate circuit 61 thus emits an output signal which is amplified and passed through a threshold detector 62. Threshold detector 62 is set at a predetermined value which assures that the rate circuit output from 61 is not a spurious or transient signal, but rather, is a true output signifying that velocity generator 60 is changing its rate in response to the slowly varying test signal. When a true rate output has been passed by threshold detector 62, one "true" input condition is applied to the exclusive OR circuit 64.

As is well known, an exclusive OR circuit, such as OR circuit 64, passes an output signal only when one input is "true" and its other input is "false." Two "true" or two "false" inputs to OR circuit 64 will not satisfy the input requirements for the exclusive OR circuit 64.

In the instance just described, threshold detector 62 presents a true condition to OR circuit 64 while threshold detector 57 presents a false condition. Exclusive OR circuit 64 is thus satisfied and it, in turn, emits a true output level. A pair of AND gates 63 and 69 are connected at their inputs to OR circuit 64 and to threshold detectors 57 and 62. AND gate 63 receives a true level on both of its inputs. One true level is from OR circuit 64 and the other true level is from threshold detector 62. These true levels satisfy AND gate 63. AND gate 69, on the other hand, receives a false level from threshold detector 57 and thus it is not satisfied.

AND gate 63 delivers a disable signal to servo motor 45. This disable signal may open a switch (not shown) so as to remove power from servo motor 45. At the same time, brake 65 is engaged by a signal from AND gate 63. Brake 65, when engaged, locks up the gear train of channel 5 thus leaving gear 51 of differential 42 free to turn under control of channel 10, while gear 46 of differential 42 is immobilized from any further movement. Accordingly, the failed channel 5 has been automatically detected as exhibiting a hardover failure, and it has been removed from the servo system without adversely disturbing the authority of the system.

Also, connected to the output of AND gate 63 is any known warning indicator 66 such as a lamp or buzzer shown simply in block form. This warning indicator 66 is preferably located in the instrument panel of the vehicle being controlled. As an alternative, the warning indicators may be responsive to an output signal from difference and threshold detector 26. If controlled by detector 26, then the warning signal indicates that a difference above a predetermined threshold has been detected and a test signal is being applied. By setting the threshold level of detectors 57 and 62 at a higher value than the threshold level for detector 26, it is possible to indicate to the pilot that a difference in servo channel operation has occurred but the operational difference is within the allowable limits. Thus, until the warning indicator controlled by either AND gate 63 or AND gate 69 is acivated, the pilot knows that both channels are still operational.

AND gate 63 also energizes relay K2 which opens normally closed switches K2A and K2B. Opening switch K2A removes power from relay coil K1 and thus the test signal from generator 32 is removed from the summing junctions 25 and 30. Opening switch K2B removes the detection circuitry for the operational channel 10 to avoid it being enabled by a spurious transient, or other noise signal. This technique assures continued operation of the active channel 10.

As noted hereinbefore the power for the detection circuitry is controlled by operation of relay K1. Whenever either channel is detected as failed, opening relay K1 removes power from the detection circuitry.

Relays K2 and K3 may be wired as self-latching which is within the state of the art and need not be shown in the drawing or described in detail. Furthermore, these relays K2 and K3 may include a manual reset (not shown) which would be located at the instrument channel so that the detection circuitry may be reinstated at will by the pilot.

It should be noted that two output leads are depicted for test signal generator 32. The output signals may advantageously be 180° out-of-phase, or they may be of opposite polarity. In either event, if both channels are operating with a different rate of response, but neither has experienced a hardover condition, then both servo motors respond to the opposite phase test signal in opposite directions at differential 42. Thus, no significant movement takes place at member 44 because the test signal is cancelled out in the mechanical differential 42. Of course, a response by a rate of change output at both velocity generators 55 and 60, fails to satisfy the exclusive OR gate 64 and thus neither channel is deactivated.

Although the principles of my invention have been described in connection with an electromagnetic system and gear differential 42, it is equally applicable to other known differentials and actuator systems. Typical of such other systems are output members that are spring-loaded in a differential position as shown, for example, in U.S. Patent 3,145,330 issued Aug. 18, 1964 to H. Hecht. Furthermore, rather than algebraically summing the servo outputs in a mechanical differential in which a velocity generator is utilized, the followed-ups for each channel may be summed together and then applied as inputs to the main summing junctions 25 and 30. In this latter alternative, both channels are cross-coupled via their position follow-up feedback signals. Again, a hardover failure in one channel will cause the normally operating channel to respond in the opposite direction so as to oppose the hardover movement. The rate of change of movement is represented in the output signals from the follow-up of the active channel, and thus the hardover fault is detected and removed before any significant uncommanded movement appears at the output member in the manner just described.

Automatic detection and correction for hardover failures by this invention, in actual tests requires approximately one-tenth to five-tenths of a second operation time, depending upon the severity of the hardover condition. Such a fast response time by my invention precludes any adverse movement of the steering surface controlled by the servo channels.

The subject invention has been described with reference to certain preferred embodiments; it will be understood by those skilled in the art to which this invention pertains that the scope and spirit of the appended claims should not necessarily be limited to the embodiments described, as certain typical replacements and refinements have been mentioned hereinbefore. For example, the foregoing description of one typical servo system, is chosen as a representative embodiment for demonstrating the principles of this invention. It should be understood that the servo motors and a differential gear output, may be replaced by linear servo actuator valves and either electrical or mechanical differential outputs, without departing from the principles of this invention.

What is claimed is:

1. A system for detecting a failed channel in a multiple channel servo system comprising:
   a plurality of servo amplifiers one for each channel;
   an actuator associated with a servo amplifier in each channel adapted for movement within predetermined position limits during normal operating conditions for the channel, each actuator being capable of assuming upon failure a hardover position beyond the predetermined limits;
   feedback means mechanically coupled to said actuator in each channel for emitting an amplifier-saturating signal to the amplifier in a failed channel, and for emitting an opposing signal to the amplifiers in those channels operating normally;
   means connected in common to all channels for detecting a signal difference in the emitted feedback signals;
   means responsive to said detecting means for applying a test signal to all the servo amplifiers, said test signal being operative for varying the rate of actuator movement in all channels except those channels having a saturated amplifier therein;
   means associated with each channel for individually sensing the rate of that channel's actuator movement in response to said test signal; and
   means responsive to said sensing means for disengaging from the servo system the channel whose actuator failed to change in rate of movement in response to the test signal.

2. A system in accordance with claim 1 wherein said actuators of the multiple channels are adapted to move a common output member, and comprise:
- a servo motor in each channel connected to a servo amplifier;
- a mechanical differential connected in common between all the servo motors and the common output member to be moved;
- a braking means for each channel responsive to said channel disengaging means for locking the servo motor of a failed channel from any further movement.

3. A system in accordance with claim 2 wherein said disengaging means is connected to the servo motor in a failed channel for rendering said motor inoperative.

4. A system in accordance with claim 2 and further comprising:
- a velocity generator for each servo motor for emitting an output signal proportional to the rotational velocity of its associated servo motor.

5. A system in accordance with claim 4 wherein said sensing means associated with each channel comprises:
- a rate circuit connected to sense the output signal of the velocity generator of the associated channel, each rate circuit being operative for emitting an output indication above a threshold value when the change in the output signal of the velocity generator exceeds a predetermined level.

6. A system in accordance with claim 5 wherein the number of channels is two and wherein said failed channel disengaging means comprises:
- logic gating means connected to the output of the rate circuits for the two channels, said logic gating means being responsive to an output indication from one rate circuit and the coincidential absence of an output indication from the other rate circuit for emitting a channel disengaging signal.

7. A system in accordance with claim 6 wherein said logic gating means further comprises:
- signal applying means for applying said disengaging signal to a servo motor and its associated brake in the failed channel.

8. A system in accordance with claim 6 and further comprising:
- a warning indicating means connected to said logic gating means and responsive to said disengaging signal for emitting a warning indication.

9. A system in accordance with claim 6 wherein said logic gating means comprises:
- an exclusive OR circuit having two input terminals, one each connected to one each of said rate circuits, and further having an output terminal;
- a first AND gate connected to the output terminal of the exclusive OR circuit and to the output of one rate circuit; and
- a second AND gate connected to the output terminal of the exclusive OR circuit and to the output of the other rate circuit.

10. A system in accordance with claim 9 and further comprising:
- first and second normally closed switching means respectively connected between a rate circuit output and the associated input terminal of said first and second AND gates;
- first switch control means connected to the output of said second AND gate for controlling said first switching means; and
- second switch control means connected to the output of said first AND gate for controlling said second switching means.

11. A system in accordance with claim 10 wherein:
said first switch control means is responsive to a disengaging signal thereat for opening said first switching means; and
said second switch control means is responsive to a disengaging signal thereat for opening said second switching means.

12. A system in accordance with claim 1 wherein said test signal applying means comprises:
- a signal generator for emitting a variable signal.

13. A system in accordance with claim 12 wherein said signal generator emits signals of opposing phase and/or polarity, and further comprising:
- means for applying said opposing signals individually to individual channels.

14. A system in accordance with claim 13 and further comprising:
- normally open switching means connected in said signal applying means for selectively connecting said signal generator to said servo amplifiers; and
- switching control means connected to said detecting means and responsive thereto for closing said switching means.

15. A system in accordance with claim 1 wherein said feedback means emit signals below a predetermined magnitude when all channels are operating normally and emit signals above said predetermined magnitude when any channel experiences a hardover failure.

16. A system for detecting a failed servo actuator channel in a multiple channel system in which all operating channels exhibit substantially concurrent and simultaneous movements of an actuator in response to input commands and in which a failed channel exhibits a hardover movement which saturates that channel from further movement, said system comprising:
- monitoring means in common with all channels for sensing a hardover condition in at least one channel, which channel is not identified by said monitoring means;
- means responsive to said monitoring means and connected to all channels for applying a variable test signal to all channels to vary the actuator movement in all channels except the failed channel;
- channel identifying means individually associated with each channel for detecting each channel's response to the test signal; and
- means responsive to said channel identifying means for disengaging from the multiple channel system the channel which failed to respond to the test signal.

17. A system in accordance with claim 16 wherein said servo actuator channel comprises:
- a signal summing junction for receiving an input command signal;
- a servo amplifying means connected to said signal summing junction;
- an actuator output means connected to said servo amplifying means and adapted for moving an output member in response thereto; and
- feedback means connected to the summing junction and coupled to the actuator output for emitting a signal proportional to the rate of movement of the actuator output.

18. A system in accordance with claim 17 wherein said feedback means emits signals less than a predetermined level for normal operating conditions in the channel and further emits signals in excess of said predetermined level for a hardover failure in the channel.

19. A system in accordance with claim 18 and further comprising:
- follow-up means in each channel connected to said signal summing junction and operative for emitting a feedback signal proportional to the amount of movement at the output member, said output member being commonly driven by all channels.

20. A system in accordance with claim 19 wherein the number of channels is two and further wherein the follow-up means and the feedback means in one channel responds to a failure in the other channel by emitting signals to said signal summing junction of said one channel which oppose the movement of the output member induced by the hardover failure in the other channel.

21. A system in accordance with claim 20 wherein said monitoring means comprises:
  a detection circuit having a first input connected to the feedback means in said one channel and a second input connected to the feedback means in said other channel, said detection circuit being responsive to a signal difference in said feedback signals above said predetermined level for emitting an output indication.

22. A system in accordance with claim 21 wherein said test signal applying means comprises:
  a test signal generator for emitting a varying test signal;
  selectively operative means for applying test signal to the summing junctions of both channels; and
  means connected to said detection circuit and responsive to said output indication therefrom for operating said selectively operative means.

References Cited

UNITED STATES PATENTS

| | | | |
|---|---|---|---|
| 2,768,343 | 10/1956 | Kutzler | 318—489 |
| 3,135,485 | 6/1964 | Miller | 318—489 XR |
| 3,166,691 | 1/1965 | McGee | 318—28 XR |

BENJAMIN DOBECK, Primary Examiner

U.S. Cl X.R.

318—28

PO-1050
(5/69)

UNITED STATES PATENT OFFICE
CERTIFICATE OF CORRECTION

Patent No. 3,462,662    Dated August 19, 1969

Inventor(s) W. E. Carpenter

It is certified that error appears in the above-identified patent and that said Letters Patent are hereby corrected as shown below:

In the specification: column 2, line 65, "shift" should be --shaft--. Column 3, line 60, "command" should be --commanded--; line 73, "failure" should be --failed--. Column 4, line 37, "contacts 29 or 28" should be --contacts 29 and 28--. Column 5, line 40, 'the", second occurrence, should be deleted. Column 6, line 12, 'followed" should be --follow--.

SIGNED AND
SEALED
MAY 5 1970

(SEAL)
Attest:

Edward M. Fletcher, Jr.

Attesting Officer

WILLIAM E. SCHUYLER, JR.
Commissioner of Patents